(12) United States Patent
Shah et al.

(10) Patent No.: US 8,241,788 B1
(45) Date of Patent: Aug. 14, 2012

(54) METHOD FOR MAKING FLAT AND HIGH-DENSITY CATHODE FOR USE IN ELECTROCHEMICAL CELLS

(75) Inventors: Ashish Shah, East Amherst, NY (US); Robert S. Rubino, Williamsville, NY (US); Hong Gan, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 1860 days.

(21) Appl. No.: 11/164,984

(22) Filed: Dec. 13, 2005

Related U.S. Application Data

(60) Provisional application No. 60/635,536, filed on Dec. 13, 2004.

(51) Int. Cl.
*H01M 4/02* (2006.01)

(52) U.S. Cl. .................. 429/209; 429/231.2; 429/231.8; 429/245

(58) Field of Classification Search ............. 429/94
See application file for complete search history.

(56) References Cited

U.S. PATENT DOCUMENTS

| | | | |
|---|---|---|---|
| 3,877,986 A | 4/1975 | Catherino | |
| 3,888,695 A | 6/1975 | Catherino | |
| 4,310,609 A | 1/1982 | Liang et al. | |
| 5,250,373 A * | 10/1993 | Muffoletto et al. | 429/161 |
| 5,346,661 A | 9/1994 | Dunyak et al. | |
| 5,435,874 A | 7/1995 | Takeuchi et al. | |
| 5,472,810 A | 12/1995 | Takeuchi et al. | |
| 5,516,340 A | 5/1996 | Takeuchi et al. | |
| 5,667,916 A | 9/1997 | Ebel et al. | |
| 5,716,728 A | 2/1998 | Smesko et al. | |
| 6,451,483 B1 | 9/2002 | Probst et al. | |
| 6,551,747 B1 * | 4/2003 | Gan | 429/245 |
| 6,645,670 B2 * | 11/2003 | Gan | 429/209 |
| 6,727,022 B2 | 4/2004 | Gan et al. | |
| 6,743,547 B2 | 6/2004 | Gan et al. | |
| 6,767,670 B2 * | 7/2004 | Paulot et al. | 429/245 |
| 6,797,019 B2 | 9/2004 | Takeuchi et al. | |
| 6,803,150 B1 * | 10/2004 | Iriyama et al. | 429/231.8 |

* cited by examiner

*Primary Examiner* — Ula C Ruddock
*Assistant Examiner* — Patricia Davis
(74) *Attorney, Agent, or Firm* — Michael F. Scalise

(57) ABSTRACT

The traditional method of pressing $CF_x$, screen and SVO sheet assembly results in an electrode that is cupped and not flat. This results in the reduction of the effective volumetric energy density of the electrode or the addition of a process step of flattening of the cathode if at all possible. The new method of assembly effectively eliminates the cupping behavior and produces a flat electrode. In addition, the physical density of the cathode is also increased.

19 Claims, 2 Drawing Sheets

US 8,241,788 B1

METHOD FOR MAKING FLAT AND HIGH-DENSITY CATHODE FOR USE IN ELECTROCHEMICAL CELLS

BACKGROUND OF THE INVENTION

This invention relates to the conversion of chemical energy to electrical energy. In particular, the present invention relates to an electrode for a lithium electrochemical cell. The electrode comprises a first cathode active material of a relatively low energy density but of a relatively high rate capability and a second active material having a relatively high energy density but of a relatively low rate capability. The first and second active materials are short circuited to each other by contacting the opposite sides of at least one perforated current collector. Alternately, the electrode can comprise spaced apart first and second perforated current collectors, the second active material being at an intermediate position with the first active material contacting the opposite, and outer current collector sides.

A preferred form of the cell has the electrode as a cathode connected to a terminal lead insulated from the casing serving as the negative terminal for the anode. The present electrode design is useful for powering an implantable medical device requiring either a medium rate power source or a high rate discharge application. Suitable implantable medical devices include cardiac pacemakers, cardiac defibrillators, neurostimulators, drug pumps, hearing assist devices, and the like.

In any event, the electrode needs to be relatively flat to minimize the occupied internal volume and maximize cell energy density. The problem is that contact pressing two disparate active materials onto opposite sides of a current collector by traditional methods often provides an electrode that is cupped. This is undesirable as it results in there being different impedance at the electrode periphery where spacing with the counter anode material is relatively close in comparison to the center of the electrode where inter-electrode spacing is greater. Cupping also adversely reduces the cell's effective volumetric energy density and frequently necessitates the addition of a remedial process step for flattening the electrode, which is not always successful.

SUMMARY OF THE INVENTION

Accordingly, the object of the present invention is to improve the performance of an electrochemical cell, particularly a lithium electrochemical cell, by improving the planarity of an electrode having disparate active materials contacted to opposite sides of a current collector. Preferably, the electrode is a cathode comprising a first cathode active material of a relatively high rate capability, such as SVO, contacted to one side of the current collector with a second cathode active material of a relatively high energy density, such as $CF_x$, contacted to the other side. In that manner, the separate SVO and $CF_x$ materials are short-circuited to each other through the perforated current collector. Providing the active materials in a short circuit relationship means that their respective attributes of high rate and high energy density benefit overall cell discharge performance.

These and other objects of the present invention will become increasingly more apparent to those skilled in the art by reference to the following description and to the appended drawings.

DETAILED DESCRIPTION OF THE PREFERRED EMBODIMENTS

Figure 2:
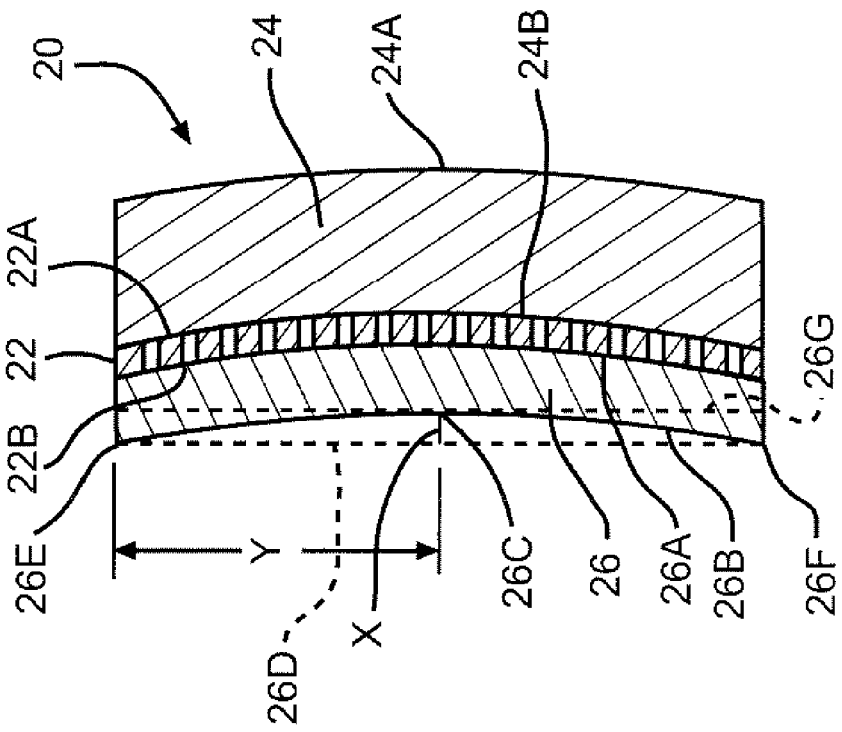
FIG. 2 is a schematic of a cathode 20 comprising materials similar to those used to construct the cathode of FIG. 1, but having been made by a prior art pressing process.

An electrochemical cell that possesses sufficient energy density and discharge capacity required to meet the vigorous requirements of implantable medical devices comprises an anode of a metal selected from Groups IA and IIA of the Periodic Table of the Elements. Such anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode current collector has an extended tab or lead contacted by a weld to a cell case of conductive metal in a case-negative electrical configuration.

The electrochemical cell further comprises a cathode of electrically conductive material that serves as the counter electrode. The cathode is of solid materials and the electrochemical reaction at the cathode involves conversion of ions that migrate from the anode to the cathode into atomic or molecular forms. The solid cathode may comprise a first active material of a metal element, a metal oxide, a mixed metal oxide and a metal sulfide, and combinations thereof, and a second active material of a carbonaceous chemistry. The metal oxide, the mixed metal oxide and the metal sulfide of the first active material has a relatively lower energy density but a relatively higher rate capability than the second active material.

The first active material is formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups, IB, IIB, IIIB, IVB, VB, VIB, VIIB and VIII, which includes the noble metals and/or other oxide and sulfide compounds. A preferred cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combinations and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $Cu_{0.16}Ag_{0.67}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and 5,516,340 to Takeuchi et al., both of which are assigned to the assignee of the present invention and incorporated herein by reference.

The cathode design of the present invention further includes a second active material of a relatively high energy density and a relatively low rate capability in comparison to the first cathode active material. The second active material is preferably a carbonaceous compound prepared from carbon and fluorine, which includes graphitic and non-graphitic forms of carbon, such as coke, charcoal or activated carbon. Fluorinated carbon is represented by the formula $(CF_x)_n$ wherein x varies between about 0.1 to 1.9 and preferably between about 0.2 and 1.2, and $(C_2F)_n$ wherein the n refers to the number of monomer units, which can vary widely.

In particular, it is generally recognized that for lithium cells, silver vanadium oxide (SVO), and specifically E-phase silver vanadium oxide ($AgV_2O_{5.5}$), is preferred as the cathode active material. This active material has a theoretical volumetric capacity of 1.37 Ah/ml. By comparison, the theoretical volumetric capacity of $CF_x$ material (x=1.1) is 2.42 Ah/ml, which is 1.77 times that of E-phase silver vanadium oxide. For powering a cardiac defibrillator, SVO is preferred because it can deliver high current pulses or high energy within a short period of time. Although $CF_x$ has higher volumetric capacity, it cannot be used in medical devices requiring a high rate discharge application due to its low to medium rate of discharge capability.

In a broader sense, it is contemplated by the scope of the present invention that the first cathode active material is any material that has a relatively lower energy density but a relatively higher rate capability than the second active material. In addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the first active material. And, in addition to fluorinated carbon, $Ag_2O$, $Ag_2O_2$, CuF, $Ag_2CrO_4$, $MnO_2$, and even SVO itself, are useful as the second active material. The theoretical volumetric capacity (Ah/ml) of $CF_x$ is 2.42, $Ag_2O_2$ is 3.24, $Ag_2O$ is 1.65 and $AgV_2O_{5.5}$ is 1.37. Thus, $CF_x$, $Ag_2O_2$, $Ag_2O$, all have higher theoretical volumetric capacities than that of SVO.

Before fabrication into an electrode structure for incorporation into an electrochemical cell according to the present invention, the first cathode active material prepared as described above is preferably mixed with a binder material such as a powdered fluoro-polymer, more preferably powdered polytetrafluoroethylene or powdered polyvinylidene flouride present at about 1 to about 5 weight percent of the cathode mixture. Further, up to about 10 weight percent of a conductive diluent is preferably added to the first cathode mixture to improve conductivity. Suitable materials for this purpose include acetylene black, carbon black and/or graphite or a metallic powder such as powdered nickel, aluminum, titanium, and stainless steel. The preferred first cathode active mixture thus includes a powdered fluoro-polymer binder present at about 3 weight percent, a conductive diluent present at about 3 weight percent and about 94 weight percent of the cathode active material. The second cathode active mixture includes a fluoro-polymer binder present at about 1 to 4 weight percent, a conductive diluent present at about 1 to 10 weight percent and about 86 to 98 weight percent of the cathode active material. A preferred second active mixture is, by weight, 91% to 98% $CF_x$, 4% to 1% PTFE and 5% to 1% carbon black. A novel electrode construction using both a high rate active material, such as SVO, and a high energy density material, such as $CF_x$, is described in U.S. Pat. No. 6,551,747 to Gan. This patent is assigned to the assignee of the present invention and incorporated herein by reference.

Cathodes for incorporation into an electrochemical cell may be prepared by rolling or pressing a quantity of the active material mixtures to form a blank prior to contact with a current collector. Alternatively, the active mixture may be provided in the form of a free-standing sheet. This is done by first adjusting the particle size of the cathode active material to a useful size followed by mixing with binder and conductive additives suspended in a suitable solvent to form a paste. The paste is then fed into a series of roll mills to form the sheet material, or the paste can first be pelletized before the rolling step. The cathode sheet material is dried and punched into cathode plates or blanks of the desired shape. For a more detailed description of the preparation of free-standing active sheets, reference is made to U.S. Pat. No. 5,435,874 to Takeuchi et al., which is assigned to the assignee of the present invention and incorporated herein by reference.

Regardless, blanks of the first and second cathode active materials are supported on a suitable current collector selected from the group consisting of stainless steel, titanium, tantalum, platinum, aluminum, gold, nickel, and alloys thereof. The preferred current collector material is titanium, and most preferably the titanium cathode current collector has a thin layer of graphite/carbon paint applied thereto. The current collector has a thickness from about 0.001 inches to about 0.01 inches, about 0.002 inches thick being preferred. For a more detailed description of a carbonaceous coating on a titanium current collector, reference is made to U.S. Pat. No. 6,767,670 to Paulot et al., which is assigned to the assignee of the present invention and incorporated herein by reference.

The conventional method of contacting disparate active materials on opposite sides of a perforated current collector is done by first pressing a $CF_x$ blank at a first pressure. An SVO sheet or blank in then placed in the bottom of a pressing fixture followed by the current collector and finally the $CF_x$ blank. If desired, the SVO blank and $CF_x$ blank can be loaded into the fixture in an opposite order. In any event, this assembly is pressed together at a second pressure higher than the first pressure used to form the $CF_x$ blank. The problem is that this technique often results in cupping of the electrode with the $CF_x$ blank curving toward the SVO. This cupping can be by 30%, or greater.

The present method involves first pressing the $CF_x$ blank at a first pressure. Next, an already manufactured SVO blank or sheet is placed in the bottom of a pressing fixture followed by the current collector and finally the $CF_x$ blank. As before, the SVO and $CF_x$ blanks can be loaded into the fixture in an opposite order. This assembly is then pressed together at a second pressure equal to or less than the first pressure used to form the $CF_x$ blank. The electrode assembly has the configuration: first active material/current collector/second active material, or in the preferred embodiment SVO/current collector/$CF_x$, with cupping in a range of about 0% to about 5%, preferably about 2%, and below.

Suitable pressing pressures range from about 0.1 tons/cm² to about 10 tons/cm², and more preferably about 0.2 tons/cm² to about 6 tons/cm². Dwell time at maximum pressure is about 1 second to about 1 minute, more preferably about 2 seconds to 30 seconds.

In addition to improving the cupping characteristics of the electrode, the density of the $CF_x$ material is increased by about 6% to 15% over that obtainable by conventional manufacturing methods, which benefits the cell's energy density. This not only results in a higher effective mechanical density, thereby reducing the size of the electrochemical cell, but it also simplifies cell construction. A cupped electrode that needs to be mechanically flattened in a remedial step not only increases the risk of damage to the electrode, but also adds an additional process step.

The mechanism for the improvement is as follows. The $CF_x$ cathode active material contains carbon as one of its ingredients. When the $CF_x$ blank is pressed at a relatively low pressure, it undergoes a certain amount of compression and upon removing the pressure, some relaxation. Next, during the assembly process when the SVO blank, current collector and $CF_x$ blank are pressed at a relatively higher pressure, the disparate active materials undergo additional compression. Each of the $CF_x$ and SVO blanks comprises first and second major sides separated by a peripheral sidewall. The perforated current collector "captures" the major side of the $CF_x$ blank that it contacts, preventing the blank from expanding (or relaxing) there. However, the other major side of the $CF_x$ blank is free to expand after the compression pressure is removed, and when it does so, the electrode deflects or cups towards the current collector and SVO blank.

In the present pressing process, however, this is prevented from happening. When the $CF_x$ blank is pressed at a first pressure, it attains a relatively higher density. During the electrode assembly process, the compression pressure is the same as or less than the first $CF_x$ blanking pressure. Since the $CF_x$ portion of the electrode assembly is already at a relatively higher density, the second pressing does not significantly increase the density of the $CF_x$ material. Consequently, the degree of relaxation experienced by the $CF_x$ material is relatively small. Also, the first and second major sides of the $CF_x$ blank relax at relatively similar rates. This prevents cupping while obtaining a high physical density.

Figure 1:
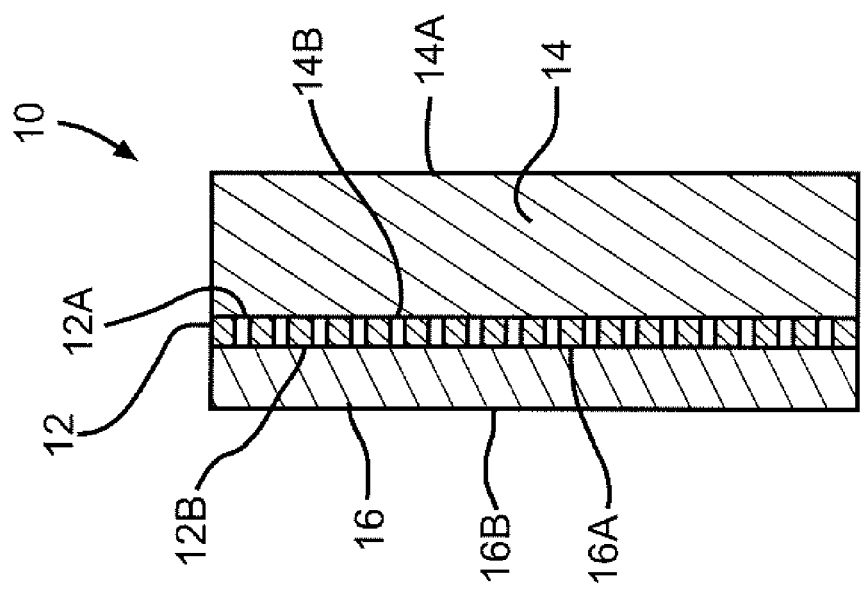
FIG. 1 is a schematic of a cathode 10 according to one embodiment of the invention having first and second active materials 14, 16 contacted to opposite sides of a perforated current collector 12.

FIG. 1 is a schematic view of one embodiment of a cathode electrode 10 according to the present invention. Electrode 10 comprises a perforated current collector 12 having opposed major sides 12A and 12B. A first cathode active material 14 of a relatively high energy density but a relatively low rate capability, preferably $CF_x$, is contacted to the first major current collector side 12A. A second cathode active material of a relatively high rate capability but a relatively low energy density, preferably SVO, is contacted to the other major current collector side 12B.

The first cathode active material 14 has first and second major sides 14A, 14B, the latter being in direct contact with the first current collector side 12A. Similarly, the second cathode active material 16 has first and second major sides 16A, 16B, the former being in direct contact with the second current collector side 12B. In an ideal construction, there is no cupping of the electrode prior to incorporation into an electrochemical cell. This means that the major sides 14A, 14B of the first active material 14 are parallel to each other as well as are the major sides 16A, 16B of the second major active material. Consequently, the first and second major sides 12A, 12B of the current collector 12 are also parallel to each other and to the respective major sides of the active materials 14, 16. As previously described, at the most the major sides of the various electrode components deflect or cup by about 5%, or less.

FIG. 2 illustrates a schematic representation of a prior art electrode 20 exhibiting significant cupping. In this drawing, the current collector 22 has major sides 22A, 22B, the first active material 24 has major sides 24A, 24B, the latter contacting side 22A of the current collector, and the second active material 26 has major sides 26A, 26B, the former being in contact with side 22B of the current collector. Because the first active blank 24 was initially pressed at a first pressure followed by the electrode assembly being pressed at a second, greater pressure, the first major side 24A of the first active material relaxes at a greater rate than the second major side 24B "captured" by the first side 22A of the current collector. This relaxation force is sufficient to deflect the entire electrode assembly toward the second electrode blank 26. The degree of cupping is shown by the distance "x", which is measured at the center point 26C of the second blank with respect to a vertical imaginary line 26D passing through the spaced apart ends 26E, 26F of the blank. A distance "y" is measured from a point where lines x and 26D intersect to either ones of the edges 26E, 26F.

In the prior art construction an imaginary tangent line 26G passing through the center point 26C is parallel to imaginary line 26D, but spaced there from. In an ideal construction according to the present invention, the lines 26D and 26G are co-linear. The degree of deflection is calculated by dividing the distance x by the distance y times 100.

Figure 3:
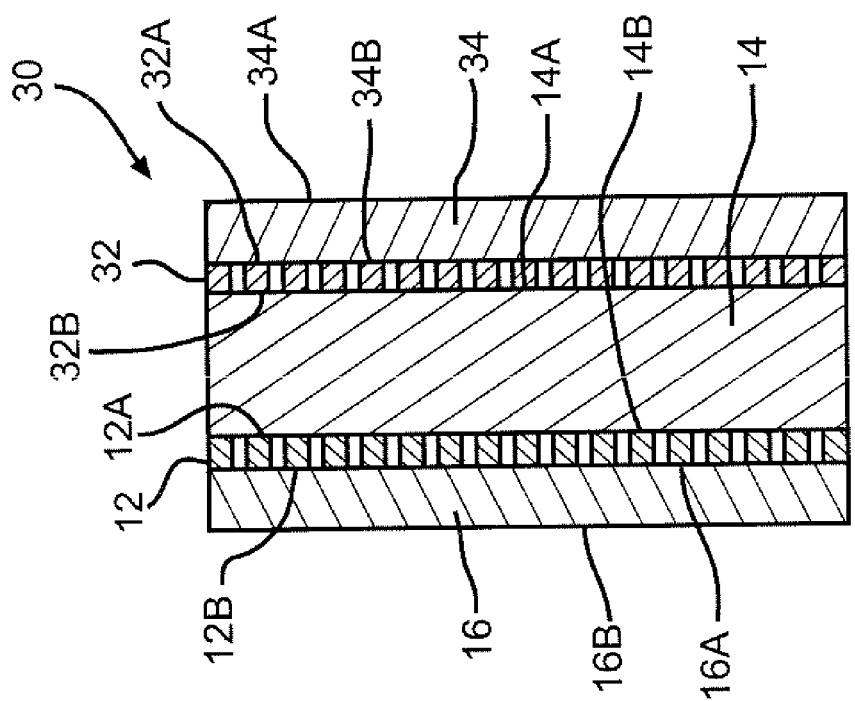
FIG. 3 is a schematic embodiment of a cathode 30 according to another embodiment of the present invention.

FIG. 3 is a schematic view of a portion of a cathode electrode 30 according to another embodiment of the present invention. This electrode 30 is preferably built by loading into the pressing fixture the various parts needed to make the electrode assembly 10 shown in FIG. 1 along with a second perforated current collector 32 having its major side 32B contacting the major side 14A of blank 14. A third blank 34 of a third active material, which is preferably SVO, is placed in the pressing fixture in contact with the bare side 32A of current collector 32 and the entire assembly is then pressed together. As before, the pressing pressure is equal to or less than that which was originally used to form blank 14. While the second and third blanks 16, 34 are described as preferably comprising SVO that is not necessary. They can be the same or different materials as long as each of them is of a relatively greater rate capability but a lesser energy density than the material of the first blank 14. Blank 14 is now sandwiched between and in direct, short circuit contact with the inner major sides 12A and 34B of the respective current collectors 12, 34

In that respect, cathodes prepared as described above may be in the form of one or more plates operatively associated with at least one or more plates of anode material, or in the form of a strip wound with a corresponding strip of anode material in a structure similar to a "jellyroll". While not shown in FIGS. 1 and 3, the cathode current collectors 32 and 34 are connected to a common terminal insulated from the cell casing (not shown) by a suitable glass-to-metal seal. This describes a case-negative cell design, which is the preferred form of the present cell. The cell can also be built in a case-positive design with the cathode current collectors contacted to the casing and the anode current collector connected to a terminal lead insulated from the casing. In a further embodiment, the cell is built in a case-neutral configuration with both the anode and the cathode connected to respective terminal leads insulated from the casing. These terminal constructions are well known by those skilled in the art.

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene/polyethylene membrane commercially available under the designation CELGARD (Celanese Plastic Company, Inc.), a membrane commercially available under the designation DEXIGLAS (C. H. Dexter, Div., Dexter Corp.), and a polyethylene membrane commercially available from Tonen Chemical Corp.

The electrochemical cell of the present invention further includes a nonaqueous, ionically conductive electrolyte that serves as a medium for migration of ions between the anode and the cathode electrodes during the electrochemical reactions of the cell. The electrochemical reaction at the electrodes involves conversion of ions in atomic or molecular forms that migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a mixture of aprotic organic solvents comprising a low viscosity solvent and a high permittivity solvent. In the case of an anode comprising lithium, preferred lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate and 1,2-dimethoxyethane.

The corrosion resistant glass used in the glass-to-metal seals has up to about 50% by weight silicon such as CABAL 12, TA 23, FUSITE 425 or FUSITE 435. The positive terminal leads preferably comprise molybdenum, although titanium, aluminum, nickel alloy, or stainless steel can also be used. The cell casing is an open container of a conductive material selected from nickel, aluminum, stainless steel, mild steel, tantalum and titanium. The casing is hermetically sealed with a lid, typically of a material similar to that of the casing.

Benefits attributed to the present process are illustrated by the following examples:

EXAMPLES

In the traditional method, the $CF_x$ material is blanked at a pressure of about 0.24 tons/cm² for about 20 seconds. The resulting $CF_x$ blank is then contacted to one side of a perforated current collector having an SVO blank contacted to the other side thereof. This assembly is then pressed together at about 4 tons/cm² for about 10 seconds. The resulting cathode exhibits cupping of about 30% to about 60%.

According to the present method, the $CF_x$ material is blanked at 4.56 tons/cm² for about 10 seconds. The resulting $CF_x$ blank is then contacted to one side of a perforated current collector having an SVO blank contacted to the other side thereof. This assembly is then subjected to a pressure of about 3.61 tons/cm² for about 10 seconds. The present process resulted in cathodes that were less than 2% cupped. Additionally, the total process time has been reduced by 10 seconds from a total of 30 seconds for the conventional method to a total of about 20 seconds for the present process.

It is appreciated that various modifications to the inventive concepts described herein may be apparent to those of ordinary skill in the art without departing from the present invention as defined by the appended claims.

What is claimed is:

1. A method for providing an electrochemical cell, comprising the steps of:
   a) providing an anode;
   b) providing a cathode comprising the steps of:
      i) pressing a first cathode active material having a relatively high energy density but a relatively low rate capability at a first pressure to form a first cathode active material blank;
      ii) positioning the first cathode active blank in a pressing fixture contacting a first major side of a first cathode current collector and a second cathode active blank of a material having a relatively low energy density but a relatively high rate capability contacting a second, opposite major side of the first cathode current collector to form a cathode assembly; and
      iii) pressing the cathode assembly at a second pressure that is less than the first pressure;
   c) providing a separator intermediate the anode and cathode in electrical association with each other; and
   d) activating the anode and cathode with a electrolyte.

2. The method of claim 1 including providing the first pressure at about 0.1 tons/cm² to about 10 tons/cm².

3. The method of claim 1 including performing the first and second pressings for a dwell time of about 2 seconds to about 60 seconds at maximum pressure.

4. The method of claim 1 including providing the second cathode active material having first and second sides, the first side contacting the cathode current collector and the second side cupping by about 5%, or less.

5. The method of claim 1 including selecting the first cathode active material from $CF_x$ and $C_2F$.

6. The method of claim 1 including selecting the second cathode active material from the group consisting of SVO, CSVO, $V_2O_5$, $MnO_2$, $LiCoO_2$, $LiNiO_2$, $LiMnO_2$, $CuO_2$, $TiS_2$, $Cu_2S$, FeS, $FeS_2$, copper vanadium oxide and mixtures thereof.

7. The method of claim 1 wherein the anode is lithium, the first cathode active material is $CF_x$, and the second cathode active material is SVO.

8. The method of claim 1 including positioning a second cathode current collector in the pressing fixture with its first major side contacting the first cathode active blank opposite the first cathode current collector and a third cathode active material blank having first and second sides, the first side contacting the second major side of the second cathode current collector and further including pressing this assembly at a third pressure no greater than the first pressure with the second side of the third cathode active blank not contacting the second current collector cupping by about 5%, or less.

9. The method of claim 8 including providing the first and second current collectors being of titanium having a layer of graphite/carbon contacted thereto.

10. The method of claim 1 including providing the current collector having a thickness from about 0.001 inches to about 0.01 inches.

11. The method of claim 1 including providing the anode of lithium in the form of at least one plate comprising an anode current collector electrically connected to a casing as its terminal and the cathode connected to a cathode terminal insulated from the casing.

12. A method for providing an implantable medical device, comprising the steps of:
   a) providing the implantable medical device except for its power source;
   b) providing a power source comprising an anode and a cathode housed inside a casing and segregated from direct contact with each other by an intermediate separator, the anode and cathode being activated by an electrolyte, providing the cathode comprising the steps of:
      i) pressing a first cathode active material having a relatively high energy density but a relatively low rate capability at a first pressure to for a first cathode active material blank;
      ii) positioning the first cathode active blank in a pressing fixture contacting a first major side of a first cathode current collector and a second cathode active blank of a material having a relatively low energy density but a relatively high rate capability contacting a second, opposite major side of the first cathode current collector to form a cathode assembly; and
      iii) pressing the cathode assembly at a second pressure that is less than the first pressure; and
   c) electrically connecting the power source to the medical device to provide a functional implantable medical device.

13. The method of claim 12 including selecting the implantable medical device from the group consisting of cardiac pacemakers, cardiac defibrillators, neurostimulators, drug pumps, and hearing assist devices.

14. A method for providing an electrochemical cell, comprising the steps of:
   a) providing an anode;
   b) providing a cathode comprising the steps of:
      i) pressing a first cathode active material selected from $CF_x$ and $C_2F$ at a first pressure to form a first cathode active material blank;
      ii) positioning the first cathode active blank in a pressing fixture contacting a first major side of a first cathode current collector and a second cathode active blank of a material selected from the group consisting of SVO, CSVO, $V_2O_5$, $MnO_2$, $LiCoO_2$, $LiNiO_2$, $LiMnO_2$, $CuO_2$, $TiS_2$, $Cu_2S$, FeS, $FeS_2$, copper vanadium oxide and mixtures thereof contacting a second, opposite major side of the first cathode current collector to form a cathode assembly; and
      iii) pressing the cathode assembly at a second pressure that is less than the first pressure;
   c) providing a separator intermediate the anode and cathode in electrical association with each other; and
   d) activating the anode and cathode with a electrolyte.

15. The method of claim 14 including providing the first pressure at about 0.1 tons/cm$^2$ to about 10 tons/cm$^2$.

16. The method of claim 14 including providing the first pressure at about 0.2 tons/cm$^2$ to about 6 tons/cm$^2$.

17. The method of claim 14 including performing the first and second pressings for a dwell time of about 2 seconds to about 60 seconds at maximum pressure.

18. The method of claim 14 including providing the second cathode active material having first and second sides, the first side contacting the cathode current collector and the second side cupping by about 5%, or less.

19. The method of claim 14 including pressing the first cathode active material at the first pressure being about 4.56 tons/cm$^2$ and then pressing the cathode assembly at the second pressure being about 3.61 tons/cm$^2$.

* * * * *